United States Patent
Kadoya et al.

(10) Patent No.: US 7,390,563 B2
(45) Date of Patent: Jun. 24, 2008

(54) CONDUCTIVE POLYPROPYLENE RESIN FOAM SHEET AND RECEPTACLE

(75) Inventors: Yuichi Kadoya, Isezaki (JP); Hirokazu Kawauchi, Isezaki (JP); Eitaroh Fukutaka, Isezaki (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 26 days.

(21) Appl. No.: 10/415,354

(22) PCT Filed: Nov. 6, 2001

(86) PCT No.: PCT/JP01/09677

§ 371 (c)(1),
(2), (4) Date: May 6, 2003

(87) PCT Pub. No.: WO02/36667

PCT Pub. Date: May 10, 2002

(65) Prior Publication Data

US 2004/0013821 A1    Jan. 22, 2004

(30) Foreign Application Priority Data

Nov. 6, 2000    (JP) .............................. 2000-337003

(51) Int. Cl.
*B32B 27/30* (2006.01)
(52) U.S. Cl. ................ 428/319.3; 428/319.7; 428/318.4
(58) Field of Classification Search .............. 428/318.4, 428/317.9, 319.1, 319.3, 319.7
See application file for complete search history.

(56) References Cited

U.S. PATENT DOCUMENTS

| | | | | |
|---|---|---|---|---|
| 3,923,697 A | * | 12/1975 | Ellis | ........................... 252/506 |
| 4,301,040 A | * | 11/1981 | Berbeco | ...................... 252/511 |
| 4,662,514 A | * | 5/1987 | Berbeco | ...................... 206/718 |
| 5,037,581 A | * | 8/1991 | Saitoh et al. | ........... 252/519.33 |
| 5,984,103 A | * | 11/1999 | Stirmel et al. | ............... 206/722 |
| 6,350,828 B1 | * | 2/2002 | Takaoka et al. | .......... 526/125.3 |
| 6,380,294 B1 | * | 4/2002 | Babinec et al. | ............. 524/440 |
| 7,014,896 B1 | * | 3/2006 | Miyakawa et al. | ......... 428/35.7 |

FOREIGN PATENT DOCUMENTS

| | | |
|---|---|---|
| EP | 899298 | 3/1999 |
| JP | 61-16851 | 1/1986 |
| JP | 64-4345 | 1/1989 |
| JP | 64-51446 | 2/1989 |
| JP | 4-253741 | 9/1992 |
| JP | 5-269911 | 10/1993 |
| JP | 8-176365 | 7/1996 |
| JP | 8-302091 | 11/1996 |
| JP | 9-226771 | 9/1997 |
| JP | 11-227134 | 8/1999 |
| JP | 2000-263721 | 9/2000 |
| JP | 2001-142042 | 5/2001 |
| JP | 2001-240122 | 9/2001 |
| WO | WO 9907752 A1 * | 2/1999 |

OTHER PUBLICATIONS

English translation of JP 64-051446, Yuuji Hiratsuka, "Polyolefin Resin Foam with Antistatic Function and Manufacturing Method Thereof", Feb. 27, 1989.*

English translation of JP 2001-240122, Miyagawa et al, "Carrier Tape", Sep. 4, 2001.*

* cited by examiner

*Primary Examiner*—Hai Vo
(74) *Attorney, Agent, or Firm*—Oblon, Spivak, McClelland, Maier & Neustadt, P.C.

(57) ABSTRACT

An electroconductive polypropylene type resin foamed sheet comprising a polypropylene type resin foamed sheet, and an electroconductive coating material layer and, preferably, a resin layer, formed on at least one side of the foamed sheet, and having a density of at least 180 kgm$^{-3}$ and less than 850 kgm$^{-3}$, wherein the resin layer has a surface resistance of less than $10^{12}$ Ω/□. A container made of such an electroconductive polypropylene type resin foamed sheet is useful for packaging an electronic component.

14 Claims, 3 Drawing Sheets

CONDUCTIVE POLYPROPYLENE RESIN FOAM SHEET AND RECEPTACLE

TECHNICAL FIELD

The present invention relates to an electroconductive polypropylene type resin foamed sheet and a container employing it. The sheet and the container are excellent in the surface electroconductivity and scarcely susceptible to abrasion. Particularly when used as a packaging container for an electronic component, it is excellent in the performance to protect the electronic component from breakage by an external shock or from an electrical damage by formation of static electricity, and has a good surface appearance. The container is useful as a container for an electronic component or as a tray for a liquid crystal display element.

BACKGROUND ART

For packaging an electronic component or the like, a foam having cushioning properties is used to prevent a damage of the product from vibration, impact shock, etc. However, such a foam is made of a thermoplastic resin and is an insulator, and accordingly, it has a high electrostatic property, thus leading to a problem such that the function of the electronic component is likely to be lost by the static electricity. If the package surface is charged with static electricity, there will be another problem that a dust is likely to deposit thereon, such being undesirable for a package.

In order to solve such problems, a method is known wherein antistatic properties are imparted by reducing the surface resistance of the package. It is known to incorporate carbon at the time of forming the package or to coat an antistatic agent on the surface of the package. Such methods are disclosed, for example, in JP-A-60-20942, JP-A-60-172529, JP-A-61-254639, JP-A-62-231739, JP-A-1-232030, JP-B-5-507510, JP-A-5-32287 and JP-A-11-209501. In these publications, foams and containers are reported. The containers are used for packaging IC.

A display device employing liquid crystal is widely used in all fields including controllers of personal computers or televisions, and car navigation systems. Such a liquid crystal display element is required to be stored so that it will receive no damage by vibration or impact shock until the final assembling, and to be safely transported, as the case requires. A container made of a foam is considered to be suitable for a liquid crystal display element. The above-mentioned publications disclose packaging of IC but disclose nothing about a liquid crystal display element.

DESCRIPTION OF THE INVENTION

The present invention is to provide an electroconductive polypropylene type resin foam sheet and a container employing it. The container is useful as a package for an electronic component or as a tray for a liquid crystal display element.

In a first aspect, the present invention provides an electroconductive polypropylene type resin foamed sheet comprising a polypropylene type resin foamed sheet, and an electroconductive coating material layer, and preferably a resin layer, formed on at least one side of the foamed sheet, and having a density of at least 180 [kgm$^{-3}$] kg·m$^{-3}$ and less than 850 [kgm$^{-3}$] kg·m$^{-3}$ and a surface resistance of less than $10^{12}$ Ω/□. A container employing this sheet can be used for packaging an electronic component. Particularly, it is suitable as a tray for a liquid crystal display element.

Figure 1:
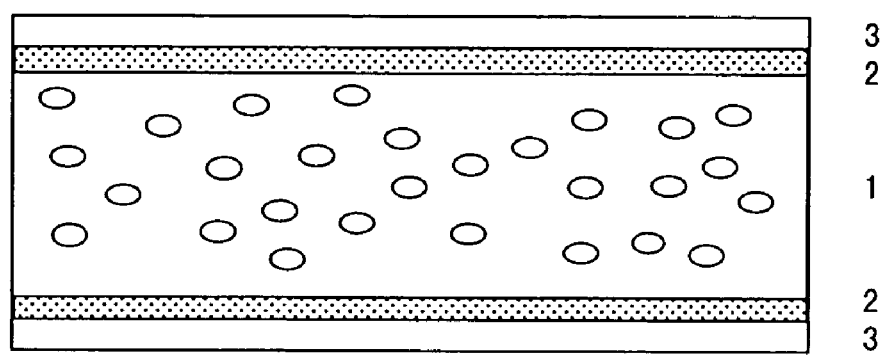
FIG. 1 is a cross-sectional view showing an example of the electroconductive polypropylene type resin foamed sheet of the present invention.

In the drawings, reference numeral 1 represents a polypropylene type resin foamed sheet, numeral 2 an electroconductive coating material layer, and numeral 3 a resin layer.

The polypropylene type resin foamed sheet is a foamed sheet comprising a polypropylene type resin as the main component. The polypropylene type resin is a homopolymer or copolymer obtained by polymerization of a propylene monomer as the main component. For example, a polymer composed mainly of polypropylene, such as a propylene type homopolymer, a propylene/ethylene copolymer or a propylene/ethylene/diene copolymer, may be employed. In order to obtain a foam excellent in heat resistance, it is preferred to employ one having a high melting point. One comprising a polypropylene type resin as the main component and having a small amount of another resin having good compatibility mixed thereto, may also be employed, and as an example of such another resin, a polyethylene or an ethylene/vinyl acetate copolymer may, for example, be mentioned. As the polypropylene type resin, one comprising from 10 to 100 wt % of a high melt tension polypropylene type resin and from 0 to 90 wt % of a linear crystalline polypropylene type resin, is preferred. More preferred is one comprising from 30 to 100 wt % of a high melt tension polypropylene type resin and from 0 to 70 wt % of a linear crystalline polypropylene type resin. If the linear crystalline polypropylene type resin is excessive, draw down of the polypropylene type resin foamed sheet tends to be large, whereby molding tends to be difficult, and irregularities due to foam breakage tend to result on the surface of the foamed sheet, whereby the surface appearance tends to deteriorate.

As the high melt tension polypropylene type resin, one commercially available may be used. One having a melt tension of at least 4.0 g/10 mm at 200° C, is preferred. More preferred is one having a melt index of at most 10 g/10 min. As the linear crystalline polypropylene type resin, one commercially available may be used.

The density of the polypropylene type resin foamed sheet is preferably at least 180 kgm$^{-3}$ and less than 850 kgm$^{-3}$, more preferably at least 300 kgm$^{-3}$ and less than 600 kgm$^{-3}$. If the density is lower than 180 kgm$^{-3}$, the closed cell ratio of foamed cells tends to be low, whereby when molded into a container, the surface appearance of the molded product tends to be poor. If the density is higher than 850 kgm$^{-3}$, the light weight nature tends to deteriorate. The closed cell ratio is preferably at least 40%. If the closed cell ratio is lower than 40%, draw down tends to be large, and the surface appearance of the molded product tends to deteriorate.

The polypropylene type resin foamed sheet can be prepared by a method wherein a polypropylene type resin, for example, a resin composition comprising a high melt tension polypropylene type resin, a linear crystalline polypropylene type resin and a blowing agent, is subjected to foam extrusion molding. A method for mixing the high melt tension polypropylene type resin and the linear crystalline polypropylene type resin is not particularly limited. However, it is possible to employ a method of directly introducing the stirred and mixed materials to an extruder at the time of molding to form a foamed sheet, or a method of melt-mixing the stirred and mixed materials by a single screw or twin screw extruder to form pellets, which are then used for foam extrusion molding.

The blowing agent may, for example, be a chemical blowing agent or a physical blowing agent. As a chemical blowing agent, a mixture of sodium hydrogencarbonate and citric acid, is preferably employed, whereby foaming gas to be generated, is carbon dioxide gas. A method for adding the chemical blowing agent is not particularly limited, and it is possible to employ, for example, a method of dry blending it to the resin composition comprising a high melt tension polypropylene type resin and a linear crystalline polypropylene type resin, a method of adding it by means of a quantitative feeder into a hopper of the extruder, or a method of adding it to a master batch prepared by using a polyolefin type resin such as a polypropylene type resin or a polyethylene resin, as the base material. The amount of the chemical blowing agent to be added, is within a range where the desired foaming ratio can be obtained, and its specific amount may vary depending upon the type of the blowing agent. It is usually preferred to add it in an amount of from 0.1 to 3.0 parts by weight, per 100 parts by weight of the polypropylene type resin. If the amount is less than 0.1 part by weight, it tends to be difficult to obtain a desired foaming ratio, and if it is added in an amount exceeding 3.0 parts by weight, uniform dispersion and sufficient decomposition of the blowing agent in the extruder may not proceed, whereby it may not be possible to obtain a good foam.

As the physical blowing agent, carbon dioxide gas or butane may, for example, be mentioned. From the viewpoint of safety, carbon dioxide gas is preferably employed. A method for adding the physical blowing agent may, for example, be a method of supplying it to a center zone of a twin screw extruder or to a center zone of a first stage extruder of a tandem extruder. The amount of the physical blowing agent to be added, is within a range where a desired foaming ratio can be obtained. It is preferably from 1.2 to 3.0 parts by weight per 100 parts by weight of the polypropylene type resin composition. If the amount is less than 1.2 parts by weight, it tends to be difficult to obtain a desired foaming ratio, and if it is added beyond 3.0 parts by weight, the closed cell ratio tends to be low.

The average foam diameter in the extrusion direction of the polypropylene type resin foamed sheet is preferably at most 300 μm, more preferably at most 250 μm, most preferably at most 200 μm, the average foam diameter in a direction perpendicular to the extrusion direction is preferably at most 200 μm, more preferably at most 150 μm, and the average foam diameter in the thickness direction is preferably at most 100 μm, more preferably at most 80 μm. If the average foam diameter becomes large, smoothness of the sheet surface tends to deteriorate, thus leading to a roughened surface, whereby the surface appearance of the foamed sheet or a container obtained by molding the foamed sheet, deteriorates, such being undesirable.

At the time of producing the polypropylene type resin foamed sheet, a desired foam-controlling agent, a crosslinking agent, a foaming assistant, a filler, a stabilizer, an antioxidant, a pigment, etc., may be mixed within a range not to impair the physical properties of the polypropylene type resin foamed sheet.

The electroconductive coating material is one comprising at least electroconductive particles and a binder, and it includes one further containing a solvent such as an organic solvent or water. The electroconductive particles are particles having electroconductivity. For example, an electroconductive metal compound or carbon black may be mentioned. The electroconductive metal compound may, for example, be an antimony-doped titanium oxide, titanium oxide having surface treated with tin oxide, tin oxide, or an aluminum-doped zinc oxide. The binder may, for example, be an acrylic resin, a polyester resin, a polyurethane resin or an epoxy resin. The electroconductive coating material is coated on at least one side of the polypropylene type resin foamed sheet to form an electroconductive coating layer, and a resin layer is further formed thereon, to obtain the electroconductive polypropylene type resin foamed sheet. The resin for the resin layer may be the same as the binder, such as an acrylic resin, a polyester resin, a polyurethane resin or an epoxy resin. In the same electroconductive polypropylene type resin foamed sheet, the binder of the electroconductive coating material and the resin of the resin layer may be the same or different. To form the electroconductive coating layer and the resin layer by coating the electroconductive coating material and the resin, a method such as direct gravure, offset gravure, reverse coating, comma coating, air knife coating, die head coating or Meyer bar coating, may be employed. The electroconductive coating material layer and the resin layer are formed on at least one side of the polypropylene type resin foamed sheet.

The surface resistance of the resin layer of the electroconductive polypropylene type resin foamed sheet is preferably less than $10^{12}$ Ω/□. If the surface resistance becomes $10^{12}$ Ω/□ or higher, static electricity will form by electrification of the surface of the foam, whereby dust is likely to deposit, such being undesirable for a package for an electronic component. Further, due to static electricity charged, such a component or equipment tends to lose its function, such being undesirable. Especially preferably, the surface resistance is less than $10^8$ Ω/□.

The thickness of the electroconductive polypropylene type resin foamed sheet is preferably at least 0.5 mm and less than 2.5 mm, more preferably at least 0.8 mm and less than 2.0 mm, most preferably at least 1.0 mm and less than 1.8 mm. If the thickness is thinner, the rigidity of the obtained foamed sheet tends to be lower, and if it is thicker, time for preliminary heating at the time of thermoforming tends to be longer, whereby the productivity tends to deteriorate.

The electroconductive polypropylene type resin foamed sheet can be formed into and used as a container, particularly a container for packaging an electronic component. For such forming of the electroconductive polypropylene type resin foamed sheet, thermoforming is preferred. The thermoforming means a method wherein a molded sheet is softened under heating and shaped by an application of an external force while being softened. As methods of using air as an external force for the thermoforming, there are two types i.e. vacuum forming and pressure forming. As methods for heating the sheet, there are an indirect heating method by a heater, a direct heating method wherein the sheet is contacted with a hot plate, and a method of heating by hot air. Many forming methods are known such as ones employing a combination of male and female dies or a plug, and ones employing assisting air. For example, straight vacuum forming, straight pressure forming, drape vacuum forming, drape pressure forming, plug assist forming, drape and plug assist forming, plug assist pressure forming, plug assist reverse draw forming, air cushion forming, plug assist air stripe forming or multimold (press) forming, may be mentioned.

Figure 2:
FIG. 2 is a cross-sectional view of a tray.
Figure 3:
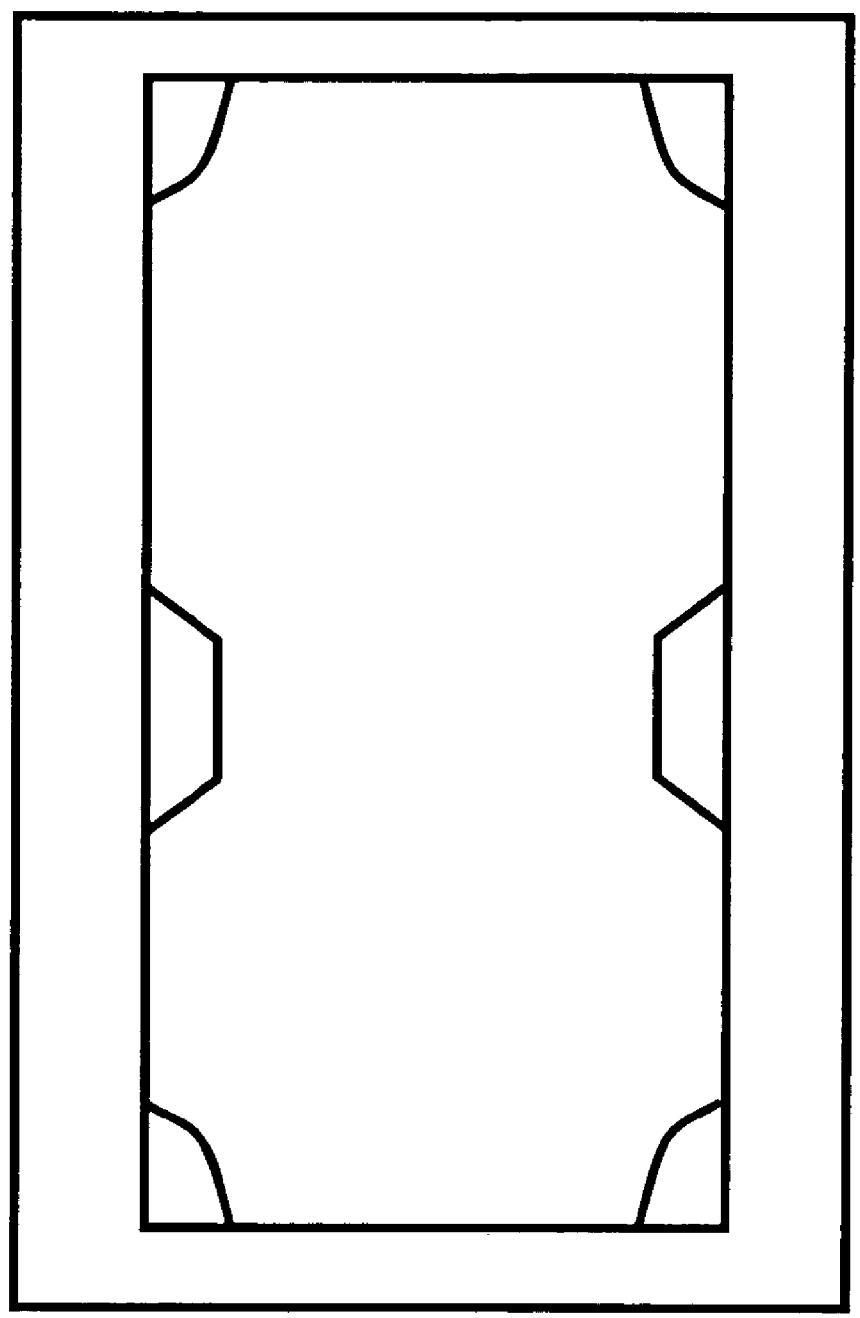
FIG. 3 is a top view of the tray.

A container made of the electroconductive polypropylene type resin foamed sheet is useful as a container for packaging a liquid crystal display element. A display device employing liquid crystal is widely used in all fields including controllers for personal computers or televisions, and car navigation devices. Such a liquid crystal display element is required to be stored not to receive damages by vibration or impact shock until the final assembling and is required to be safely transported, as the case requires. A tray made of the electroconductive polypropylene type resin foamed sheet is useful for such an application. The tray for a liquid crystal display element preferably has a pocket portion for receiving a liquid crystal display element therein and a support portion for supporting the liquid crystal display element. FIGS. 2 and 3 illustrate an example of such a tray. The tray is not limited to one having only one pocket portion as illustrated in FIGS. 2 and 3. It may have a plurality of pocket portions. The tray for a liquid crystal display element is scarcely abraded by contact with the liquid crystal display element and is excellent in the performance for protecting the liquid crystal display element from breakage by an impact shock from the exterior or from an electrical shock due to formation of static electricity. The electroconductive polypropylene type resin foamed sheet is useful as a tray for a liquid crystal display element, but depending upon the conditions for using the tray, it is preferred to adjust the electroconductive coating material layer and the resin layer of the electroconductive polypropylene type resin foamed sheet. The electroconductive coating material layer and the resin layer may be made thin, if the conditions for use are not so severe.

The tray made of a foam having a cushioning property is suitable for transportation of a liquid crystal display element. The foam is preferably made to have a surface resistance of less than $10^{12}$ $\Omega/\square$ by some means. If the surface resistance is $10^{12}$ $\Omega/\square$ or higher, static electricity will form by electrification of the surface of the foam, whereby dust will attach thereto, such being undesirable for packaging of an electronic component. Further, due to the charged static electricity, such a component or equipment is likely to lose its function, such being undesirable.

In order to lower the surface resistance, it is preferred to provide an electroconductive layer on the surface, like the electroconductive polypropylene type resin foamed sheet. Otherwise, a method may be available in which an antistatic agent is incorporated to a thermoplastic resin. As such an antistatic agent, a polyether ester amide type resin may, for example, be used. In order to make the antistatic performance uniform, a compatibilizing agent may be used to uniformly disperse the antistatic agent.

BEST MODE FOR CARRYING OUT THE INVENTION

Now, the present invention will be described in detail with reference to Examples.

EXAMPLE 1

70 wt % of a high melt tension polypropylene type resin (PF-814, manufactured by Montell SDK Sunrise Co.) having a density of 0.90 a melt flow rate of 3.0 g/min (measured at 230° C. by the method of JIS K6758) and melt tension at 200° C of 30.0 g (the tension when, using a capillograph manufactured by Toyo Seiki Seisaku-Sho, Ltd., the polypropylene was heated and melted at 200° C. for 5 minutes in a barrel of the apparatus, and the molten polypropylene was extruded into atmospheric air at a rate of 15 mm/min from a capillary having a diameter of 2.095 mm and a length of 8 mm with L/D=3.8 to obtain a strand, and this strand was withdrawn at a rate of 2.0 m/mm), 30 wt % of a linear crystalline polypropylene type resin (PL504A, manufactured by Montell SDK Sunrise Co.) having a density of 0.90 and a melt flow rate of 3.3 g/10 min, and further, as a blowing agent, 4.0 parts by weight, per 100 parts by weight of the polypropylene type resins, of a heat decomposable blowing agent (CF40E, manufactured by Clariant K.K.) were mixed by a tumbler mixer, and this mixture was subjected to foaming extrusion by means of a 90 mm single screw extruder (L/D=34), manufactured by Toshiba Machine Co., Ltd. at a cylinder temperature of 220° C. by a 100 M/M circular die (setting temperature: 190° C.) to obtain a foamed sheet having a thickness of 1.0 mm.

On both sides of the obtained foamed sheet, an electroconductive coating material prepared by using a methyl methacrylate/methacrylate copolymer resin as a binder and an IPA/ethyl acetate=9/1 as a mixed solvent so that the concentration of Sb-doped titanium oxide (ET-500W, manufactured by Ishihara Sangyo K.K.) would be 30%, was coated by a direct gravure printing machine so that the coating layer thickness would be 5 μm and dried at 60° C. for about 1 hour. Then, on the electroconductive coating material layer, an acrylic resin using a methyl methacrylate/methacrylate copolymer resin and IPA/ethyl acetate=9/1 as a solvent, was further coated so that the coating thickness would be 5 μm and dried at 60° C. for about 1 hour, to prepare an electroconductive polypropylene type resin foamed sheet. The density of the obtained electroconductive polypropylene type resin foamed sheet was measured by an electron specific gravity meter (MD-200S) manufactured by Mirage Trading Co., whereby it was 360 kgm$^{-3}$.

The average foam diameters of the obtained foamed sheet, were observed by a microscope from the sheet surface and cross-sectional directions, whereby average foam diameters were obtained from average values of diameters of 50 foams in the extrusion direction, a direction perpendicular to the extrusion direction and the thickness direction, and found to be 180 μm in the extrusion direction, 128 μm in a direction perpendicular to the extrusion direction and 50 μm in the thickness direction.

The electroconductive polypropylene type resin foamed sheet was formed into a tray of 300 mm in length×150 mm in width×30 mm in height having a shape as shown in FIGS. 2 and 3 by a vacuum forming machine, manufactured by Asano Kenkyusho K.K. The forming was carried out under sheet heating conditions of a heater temperature of 500° C. and a heating time of 25 seconds, whereby a tray having a good outer appearance was obtained. The surface resistance of the tray (using "Hiresta UP, MCP-HT450, J box U type, manufactured by Mitsubishi Chemical Corporation, measuring terminals were contacted with the foam with an applied voltage of 500 V, and the value upon expiration of 1 minute was measured) was $8.1\times10^6$ $\Omega/\square$.

The tray surface was abraded 150 times by a glass piece with a corner portion having an angle of 90° at a speed of 30 reciprocations per minute, whereby formation of turnings were inspected, and no formation of turnings was observed. A liquid crystal display element was accommodated and repeatedly used, whereby no formation of turnings was observed. Also with respect to a sheet having no electroconductive coating material layer or no resin layer, the test was carried out, whereby in the repeated use, formation of turnings was observed. However, in one way use, no formation of turnings was observed.

EXAMPLE 2

In the same manner as in Example 1, an electroconductive polypropylene type resin foamed sheet was prepared with a blend system comprising 50 wt % of the high melt tension polypropylene type resin and 50 wt % of the linear crystalline polypropylene type resin, and 4.0 parts by weight, per 100 parts by weight of the polypropylene type resins, of the blowing agent. The density of the obtained electroconductive polypropylene type resin foamed sheet was 400 [kgm$^{-3}$] kg·m$^{-3}$. The average foam diameters of the foamed sheet were measured in the same manner as in Example 1, and they were 198 μm in the extrusion direction, 143 μm in a direction perpendicular to the extrusion direction and 68 μm in the thickness direction.

The obtained electroconductive polypropylene type resin foamed sheet was formed into a tray in the same manner as in Example 1, whereby the forming property was good, and a tray having a good outer appearance was obtained.

The surface resistance of the tray was 6.5×10$^6$ Ω/□, and formation of turnings was inspected in the same manner as in Example 1 with the corner portion having an angle of 90° of a glass piece, whereby no formation of turnings was observed. Also with respect to a sheet having no electroconductive coating material layer or no resin layer, the test was carried out, whereby in repeated use, formation of turnings was observed. However, in one way use, no formation of turnings was observed.

EXAMPLE 3

An electroconductive polypropylene type resin foamed sheet was prepared in the same manner as in Example 1 except that only the electroconductive coating material was coated on the foamed sheet prepared in Example 1. The density of the electroconductive polypropylene type resin foamed sheet was 370 [kgm$^{-3}$] kg·m$^{-3}$. The average foam diameters of the foamed sheet were measured in the same manner as in Example 1 and found to be 178 μm in the extrusion direction, 130 μm in a direction perpendicular to the extrusion direction and 40 μm in the thickness direction. The obtained electroconductive polypropylene type resin foamed sheet was formed into a tray in the same manner as in Example 1, whereby the forming property was good, and a tray having a good outer appearance was obtained. The surface resistance of the tray was 7.0×10$^5$ Ω/□. Formation of turnings was inspected by abrading the surface of the tray in the same manner as in Example 1 with the corner portion having an angle of 90° of a glass piece, whereby formation of turnings was observed. A liquid crystal display element was accommodated and repeatedly used, whereby formation of turnings was observed. However, in one way use, it was used as a container for the liquid crystal display element without any particular problem.

In the same manner as in Example 1, an electroconductive polypropylene type resin foamed sheet was prepared with a blend system comprising 100 parts by weight of the linear crystalline polypropylene type resin and 5.0 parts by weight of the blowing agent. The density of the electroconductive polypropylene type resin foamed sheet was 500 [kgm$^{-3}$] kg·m$^{-3}$, and the average foam diameters were 340 μm in the extrusion direction, 210 μm in a direction perpendicular to the extrusion direction and 80 μm in the thickness direction. The sheet surface had irregularity and poor smoothness, and the surface appearance was poor. The obtained electroconductive polypropylene type resin foamed sheet was formed into a tray, whereby draw down at the time of heating the sheet was large, and it was impossible to carry out formation of a tray.

The electroconductive polypropylene type resin foamed sheet of the present invention is excellent in the electroconductivity of the foamed sheet surface, and the electroconductive coating material layer is scarcely susceptible to abrasion due to friction, and it is excellent in the performance for protecting an electronic component from breakage due to impact shock from the exterior or from an electrical damage due to formation of static electricity. Thus, it is useful as a packaging material for an electronic component.

The invention claimed is:

1. An electroconductive polypropylene resin sheet, comprising:
    a foamed layer consisting of a foamed combination of a high melt tension polypropylene resin and a linear crystalline polypropylene resin, and a blowing agent, and
    an electroconductive layer that is coated on at least one side of the foamed layer,
    wherein the electroconductive layer is comprised of an electroconductive coating material that is comprised of electrically conductive particles in a methyl methacrylate/methacrylate copolymer resin binder,
    wherein the electroconductive polypropylene resin sheet has a density of at least 180 kg/m$^3$ to less than 850 kg/m$^3$, and a surface resistance of less than 10$^{12}$ Ω/□.
    wherein the foamed layer is directly adjacent and in continuous contact with the electroconductive layer, and
    wherein the linear crystalline polypropylene resin is present in an amount of from 50 to 90% by weight of the foamed combination of the foamed layer.

2. The electroconductive polypropylene resin sheet according to claim 1, wherein
    the average diameter of the foam cells of the foamed layer are at most 300 μm in the extrusion direction, at most 200 μm in a direction perpendicular to the extrusion direction and at most 100 μm in the thickness direction.

3. The electroconductive polypropylene resin sheet according to claim 1, wherein the electrically conductive particles are particles of at least one of carbon black, antimony-doped titanium oxide, titanium oxide surface treated with tin oxide, tin oxide and aluminum-doped zinc oxide.

4. The electroconductive polypropylene resin sheet according to claim 1, wherein the electroconductive polyproylene resin sheet further comprises a resin layer on the surface of the electroconductive layer, the resin layer being an acrylic resin, a polyester resin, a polyurethane resin or an epoxy resin.

5. A container made of an electroconductive polypropylene resin sheet according to claim 1.

6. A container for packaging an electronic component made of an electroconductive polypropylene resin sheet according to claim 1.

7. A tray for a liquid crystal display element made of an electro conductive polypropylene resin sheet according to claim 1.

8. The tray for a liquid crystal display element according to claim 7, which has a pocket portion for receiving a liquid crystal display element therein and a support portion for supporting the liquid crystal display element.

9. The tray for a liquid crystal display element according to claim 7, which is obtained by injection molding or by vacuum forming of the foam in the shape of a sheet.

10. The electroconductive polypropylene resin sheet according to claim 1, wherein the high melt tension polypropylene resin has a melt index of 4.0 to 10 g/min at 200° C.

11. The electroconductive polypropylene resin sheet according to claim 1, wherein the linear crystalline polypropylene resin is present in the foamed layer in an amount of from 50 to 70% by weight.

12. The electroconductive polypropylene resin sheet according to claim 1, wherein the thickness of the foamed layer is at least 0.5 mm and less than 2.5 mm.

13. An electroconductive polypropylene resin sheet, comprising:
a foamed layer consisting of from 10 to 50 wt % of a high melt tension polypropylene resin and from 50 to 90 wt % of a linear crystalline polypropylene resin, and a blowing agent, and
an electroconductive layer that consists essentially of electrically conductive particles in a methyl methacrylate/methacrylate copolymer resin binder, formed on at least one side of the foamed layer,
wherein the electroconductive polypropylene resin sheet has a density of at least 180 kg/m$^3$ to less than 850 kg/m$^3$, and a surface resistance of less than $10^{12}$ Ω/□, and
wherein the foamed layer is directly adjacent and in continuous contact with the electroconductive layer.

14. An electroconductive polypropylene resin sheet comprising:
a foamed layer consisting of from 10 to 50 wt % of a high melt tension polypropylene resin and from 50 to 90 wt % of a linear crystalline polypropylene resin, and a blowing agent, and
an electroconductive layer coated on the foamed layer,
wherein the electroconductive layer is comprised of electrically conductive particles of Sb-doped titanium oxide in a methy methacrylate/methacrylate copolymer resin binder,
wherein the electroconductive polypropylene resin sheet has a density of at least 180 kg/m$^3$ to less than 850 kg/m$^3$, and a surface resistance of less than $10^{12}$ Ω/□, and
wherein the foamed layer is directly adjacent and in continuous contact with the electroconductive layer.

* * * * *